(12) United States Patent
Itami

(10) Patent No.: US 8,335,000 B2
(45) Date of Patent: Dec. 18, 2012

(54) JOB PROCESSING SYSTEM TO TRANSMIT JOB TRACKING INFORMATION TO ARCHIVING SERVER APPARATUS

(75) Inventor: Tsuyoshi Itami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 953 days.

(21) Appl. No.: 12/401,406

(22) Filed: Mar. 10, 2009

(65) Prior Publication Data

US 2009/0231615 A1  Sep. 17, 2009

(30) Foreign Application Priority Data

Mar. 14, 2008 (JP) ................................ 2008-065798

(51) Int. Cl.
G06F 3/12 (2006.01)
G06F 17/30 (2006.01)

(52) U.S. Cl. ........................................ 358/1.15; 726/20

(58) Field of Classification Search ................ 358/1.15, 358/1.16; 382/115; 706/13
See application file for complete search history.

(56) References Cited

U.S. PATENT DOCUMENTS

2007/0133054 A1* 6/2007 Kobayashi et al. .......... 358/1.16
2007/0245153 A1* 10/2007 Richtsmeier et al. ......... 713/186

FOREIGN PATENT DOCUMENTS

| JP | 11-46265 A | 2/1999 |
| JP | 2002-149371 A | 5/2002 |
| JP | 2003-330677 A | 11/2003 |
| JP | 2004-118243 A | 4/2004 |

* cited by examiner

Primary Examiner — Thomas Lett
Assistant Examiner — Sunil Chacko
(74) Attorney, Agent, or Firm — Canon USA, Inc., IP Division

(57) ABSTRACT

An information processing apparatus transmits photographic data of a job operator and identification information of the job operator to a server apparatus. The server apparatus calculates a matching rate for each piece of identification information based on a comparison between photographic data registered beforehand in a storage device and the received photographic data. Then, the server apparatus transfers the calculated matching rate to the information processing apparatus. The information processing apparatus performs processing based on the matching rate to reduce the data amount of the photographic data of the job operator.

7 Claims, 7 Drawing Sheets

FIG. 5
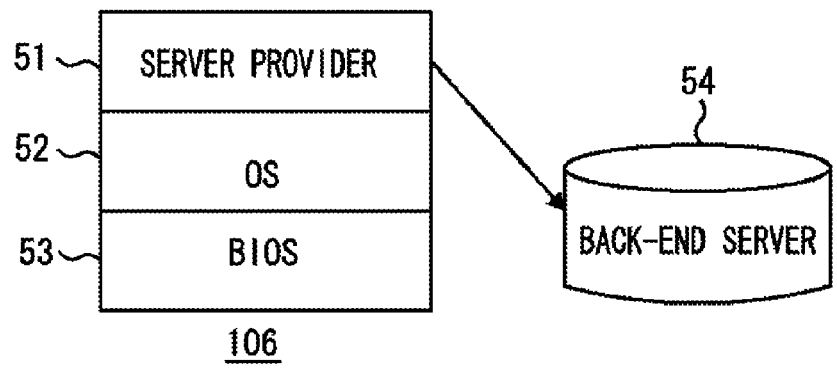
FIG. 6A
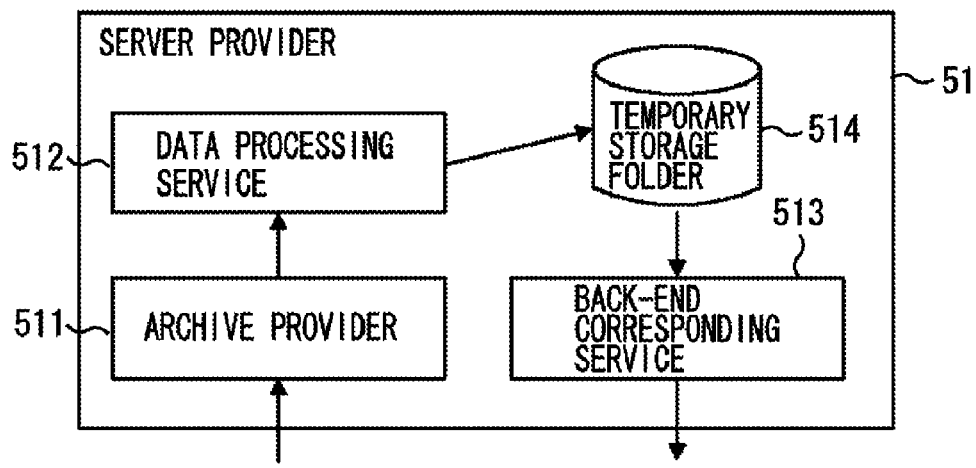
FIG. 6B
| JOB ID | USER ID | DATE | SCAN BMP | MATCHING RATE | PHOTOGRAPHIC DATA |
|--------|---------|------|----------|---------------|-------------------|
| 01234 | 01 | 2006/12/06 | ..¥01234.bmp | 95 | NO DATA IS PRESENT BECAUSE OF HIGH MATCHING RATE |
| 01235 | 03 | 2006/12/07 | ..¥01235.bmp | 30 | ..¥01235.bmp |
| 01236 | 01 | 2006/12/07 | ..¥01236.bmp | 95 | NO DATA IS PRESENT BECAUSE OF HIGH MATCHING RATE |

JOB PROCESSING SYSTEM TO TRANSMIT JOB TRACKING INFORMATION TO ARCHIVING SERVER APPARATUS

BACKGROUND OF THE INVENTION

1. Field of the Invention

The present invention relates to a job processing system, in which an information processing apparatus outputs a job and can communicate with a server apparatus.

2. Description of the Related Art

Due to recent advancement of image formation technologies, anybody can easily copy an image and transmit data using an image forming apparatus. The image forming apparatuses can improve the usability of users. However, the image forming apparatuses enable users to easily obtain confidential documents or documents related to personal information. In this respect, it is important to prohibit unauthorized processing and prevent leakage of confidential information.

There is business information (e.g., client information) to be managed as confidential information. Leak of such confidential information must be strictly prevented.

As the image forming apparatuses and communication apparatuses are improving their functions, any leakage of information if occurs in the future is considered to be very huge in its scale compared to conventional cases. Therefore, an administrator of a job processing system is required to carefully manage the information relating to business confidentiality and prevent leakage of the information to a third party or person.

Development in digitization, networking, and mobilization of various kinds of information is increasing the accessibility to a massive information source.

This trend will be more significant if the technologies further improve the portability of information.

As a conventional method for preventing information from being leaked to a third party or person, it is possible to set a right to access a storage server storing confidential information.

However, the recent cases relating to information leak have been rather conducted by the persons who are allowed to access confidential information with their intent to personally obtain the information.

From the foregoing, setting the right to access confidential information is considered to be insufficient to effectively prevent the leakage of information.

The information to be protected is not limited to a huge scale of information represented by client information owned by a large-scale entity. For example, there is information that is valuable in its quality and should be protected, even if the amount of information is small.

This kind of information can be easily taken out, for example, as a print product of a printer or as an output result of a multifunction peripheral (MFP) having Copy, Print, FAX, and Send functions. It is therefore desired to provide any measure capable of preventing information leak of the output jobs. Hereinafter, conventional information leak prevention technologies relating to image forming apparatuses (e.g., printers) are described.

For example, as discussed in Japanese Patent Application Laid-Open No. 2002-149371, there is a conventional technique applicable to prevent the leakage of print information from an image forming apparatus.

According to a method discussed in Japanese Patent Application Laid-Open No. 2002-149371, print data is stored in a print server for the use in a reprint operation, and a print log is stored by adding various information (e.g., job name, client name, and user name) and a time stamp to print data or generating a bitmap image from the print data.

According to a method discussed in Japanese Patent Application Laid-Open No. 2003-330677, a printer acquires a print log and stores the acquired print log in the server in addition to the above-described processing.

According to a method discussed in Japanese Patent Application Laid-Open No. 2004-118243, a print server receives print data from a client together with information to be used to identify a user, generates a print log based on the print data and user information, and allows the user to perform retrieval, viewing, and reprinting processing.

There is a conventional image forming apparatus configured to prevent information leak of a printer generating paper documents and an MFP generating output jobs and also configured to constitute a system capable of not only printing the products but also storing and managing the output jobs generated by the MFP.

This type of image forming apparatus includes a storage device capable of storing information relating to image data processed by the apparatus, such as the name of a person in charge, date and time, processed information, as an image forming history.

As a system having been introduced considering the situation that the number of cases relating to information leak is increasing, there is a job history management system that can realize an integrated management of outputs generated by a printer and outputs generated by an MFP, to prevent information leak from the MFP or the printer.

The job history management system, if any unauthorized image forming processing is performed, enables an administrator to track the unauthorized conduct by checking time, place, and user information relating to the processing.

Any information, if useful to track the unauthorized conduct, can be positively collected as part of the job history to increase the reliability of history information.

As discussed in Japanese Patent Application Laid-Open No. 11-46265, there is a conventional technique using image information obtained by a network camera as history information usable to enrich the job history.

According to the system discussed in Japanese Patent Application Laid-Open No. 11-46265, the network camera captures an image of a job operator at the timing when a job is generated and photographic data of the job operator is stored in a storage device.

However, if it is required to store photographic data captured by an imaging apparatus, as job history information, when a job is generated by a client personal computer (PC) or an MFP, the following problem arises.

In this case, the job history information is image data, which requires a large storage capacity compared to that for other job information.

Therefore, if the image data (the job history information) is directly stored in a storage device of an image forming apparatus, a storage area of the storage device is mainly occupied by the job history information and cannot be sufficiently used for other functions.

SUMMARY OF THE INVENTION

Exemplary embodiments of the present invention are directed to a job processing system, a server apparatus, and an information processing apparatus, which can generate job information together with attached photographic data, in which a data amount of the attached photographic data is determined according to a matching rate derived from an authentication performed on photographic data of a job operator.

According to an aspect of the present invention, a job processing system includes an information processing apparatus configured to output a job and a server apparatus, in which the information processing apparatus and the server apparatus can communicate with each other. The server apparatus includes a storage unit configured to store photographic data of a user and identification information to be used to identify the user, an acquisition unit configured to acquire photographic data of a job operator captured when the job is generated and identification information of the job operator from the information processing apparatus, a calculation unit configured to calculate a matching rate based on a comparison between the photographic data acquired by the acquisition unit and the photographic data stored in the storage unit, and a transmission unit configured to transmit the matching rate calculated by the calculation unit to the information processing apparatus. The information processing apparatus includes an imaging unit configured to capture an image of the job operator, a transfer unit configured to transfer the photographic data of the job operator and the identification information of the job operator to the server apparatus, a reception unit configured to receive the matching rate calculated by the server apparatus, and a determination unit configured to determine processing to be performed on photographic data to be added to log information according to the matching rate received by the reception unit.

According to another aspect of the present invention, a server apparatus can communicate with an information processing apparatus configured to output a job. The server apparatus includes a storage unit configured to store photographic data of a user and identification information to be used to identify the user, an acquisition unit configured to acquire photographic data of a job operator captured when the job is generated and identification information of the job operator from the information processing apparatus, a calculation unit configured to calculate a matching rate based on a comparison between the photographic data acquired by the acquisition unit and the photographic data stored in the storage unit, and a transmission unit configured to transmit the matching rate calculated by the calculation unit to the information processing apparatus.

According to yet another aspect of the present invention, an information processing apparatus can communicate with a server apparatus configured to perform authentication processing. The information processing apparatus includes an imaging unit configured to capture an image of a job operator, a transfer unit configured to transfer photographic data of the job operator and identification information of the job operator to the server apparatus, a reception unit configured to receive a matching rate calculated by the server apparatus, and a determination unit configured to determine processing to be performed on photographic data to be added to log information according to the matching rate received by the reception unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 illustrates a module configuration of the archive server illustrated in FIG. 1.

FIG. 6A illustrates a module configuration of a service provider illustrated in FIG. 5.

FIG. 6B illustrates an example job information table stored in a temporary storage folder illustrated in FIG. 6A.

DETAILED DESCRIPTION OF THE EMBODIMENTS

Figure 1:
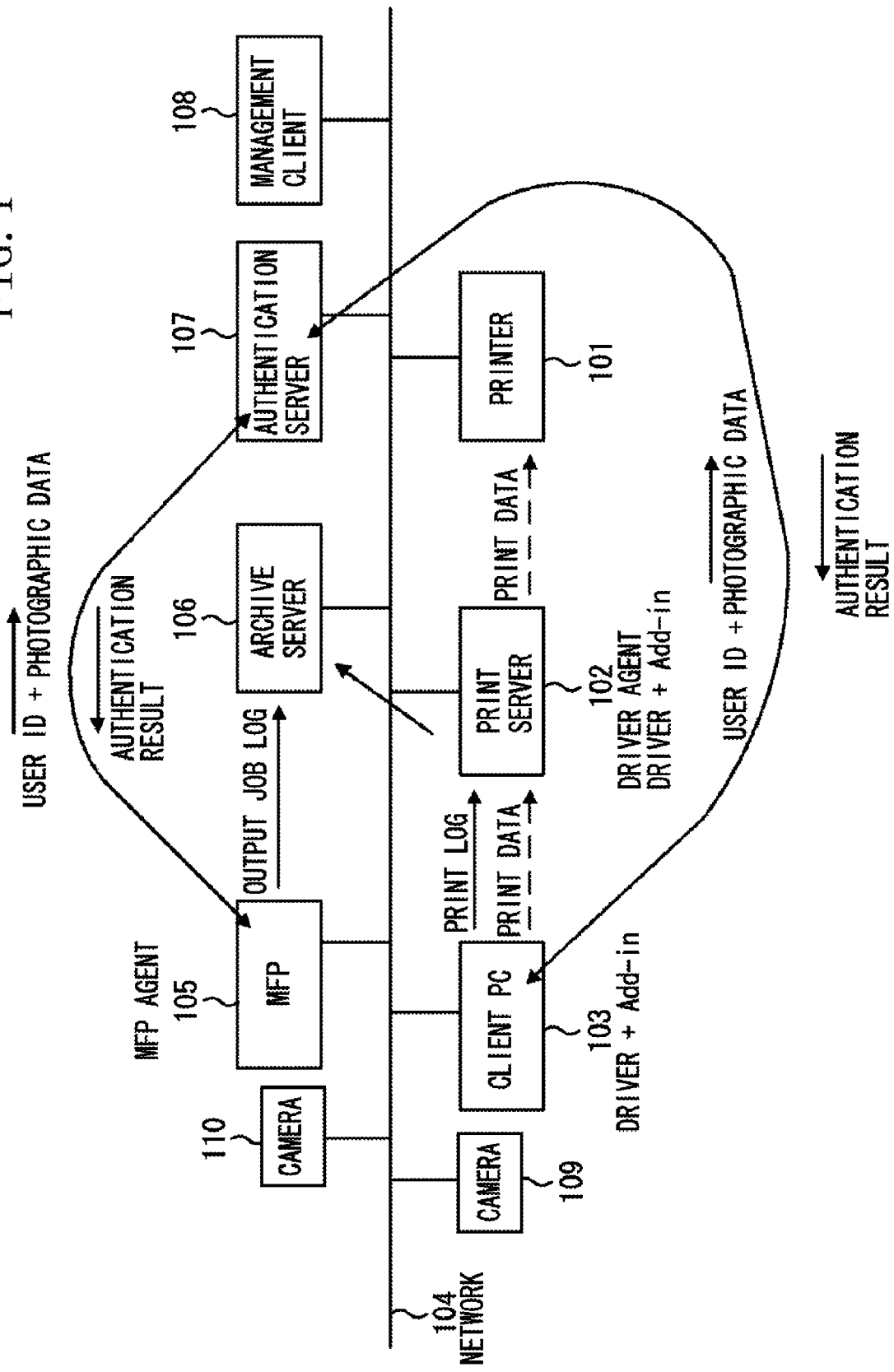
FIG. 1 is a block diagram illustrating an example configuration of a job processing system including an information processing apparatus and a server apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

FIG. 1 is a block diagram illustrating an example configuration of a job processing system including an information processing apparatus and a server apparatus according to a first exemplary embodiment of the present invention. In the job processing system according to the present exemplary embodiment, the information processing apparatus acquires an output job of an image forming apparatus and a print log managed by the server apparatus and stores job tracking information. Examples of the image forming apparatus include a printer and a multifunction peripheral (MFP).

In FIG. 1, a network 104 connects a plurality of devices that constitutes the job processing system. The devices can communicate with each other via the network 104. A printer 101 outputs print data.

A print server 102 has a print server function. A driver agent is operable on the print server 102. A client PC 103 enables a user to generate a print instruction using an application installed thereon. A storage device provided in the client PC 103 stores a determination table to be used to determine processing required for photographic data of a captured job operator according to a later-described matching rate. A detailed content of the determination table is described below with reference to FIG. 9.

A multifunction peripheral (MFP) 105 generates each job (e.g., Copy, Print, FAX, and Send) according to a user's instruction. An MFP agent is operable on the MFP 105. A storage device provided in the MFP 105 stores a determination table to be used to determine processing required for photographic data of a captured job operator according to the later-described matching rate. The detailed content of the determination table is described below with reference to FIG. 9.

An archive server 106 functions as a management server, which manages job tracking information. The archive server 106 includes a storage device, which stores and manages log information.

An authentication server 107 performs biometric authentication for a log-in user and calculates a matching rate with respect to its feature amount (hereinafter, referred to as "feature quantity matching rate"). For example, the authentication server 107 uses, for example, face image data, as photographic data, representing the job operator captured by the camera 110 or the camera 109. The authentication server 107 performs predetermined image processing on the face image data of the job operator, and stores the processed data, which is digital data converted into a form to be compared with the feature quantity, together with identification information in a storage device.

The authentication server 107 receives the photographic data of the job operator together with the user ID from the MFP 105 or the client PC 103. Then, the authentication server 107 performs similar image processing on the received photographic data and calculates a feature quantity. Then, the authentication server 107 compares a feature quantity registered in relation to the received user ID with the feature quantity calculated based on the received photographic data to calculate a matching rate. Then, the authentication server 107 transfers a value indicating the calculated matching rate to the request source (the MFP 105 or the client PC 103). In this case, the authentication server 107 can encipher the value indicating the matching rate and transfer the enciphered value to the request source (the MFP 105 or the client PC 103).

A management client 108 performs management and retrieval processing on print log information stored in the archive server 106.

A camera 109 and a camera 110, which are operable as network devices, can capture an image of a job operator upon generation of a job. The camera 109 and the camera 110 include a charge coupled device (CCD) sensor functioning as an electronic image sensor, an optical device, and an image processing engine. In the present exemplary embodiment, an imaging unit includes the camera 109 and the camera 110.

A printer driver to be used in the printer 101 and an add-in module to be used to acquire a print log are installed on the print server 102. Similarly, using a so-called point-and-print function, a printer driver and an add-in module are installed on the client PC 103.

In a print operation, print data is transmitted from the client PC 103 to the printer 101 via the print server 102, and job tracking information is transmitted from the add-in module of the client PC 103 to the driver agent of the print server 102.

In the present exemplary embodiment, the client PC 103 and the MFP 105 function as an information processing apparatus. The MFP 105 transmits photographic data of its job operator and identification information identifying the job operator (user ID illustrated in FIG. 1) to the authentication server 107.

Similarly, the client PC 103 transmits photographic data of the job operator and identification information identifying the job operator (user ID illustrated in FIG. 1) to the authentication server 107. Through the above-described processing, the authentication server 107 can receive an authentication request of each job operator from the client PC 103 or the MFP 105.

Figure 10:
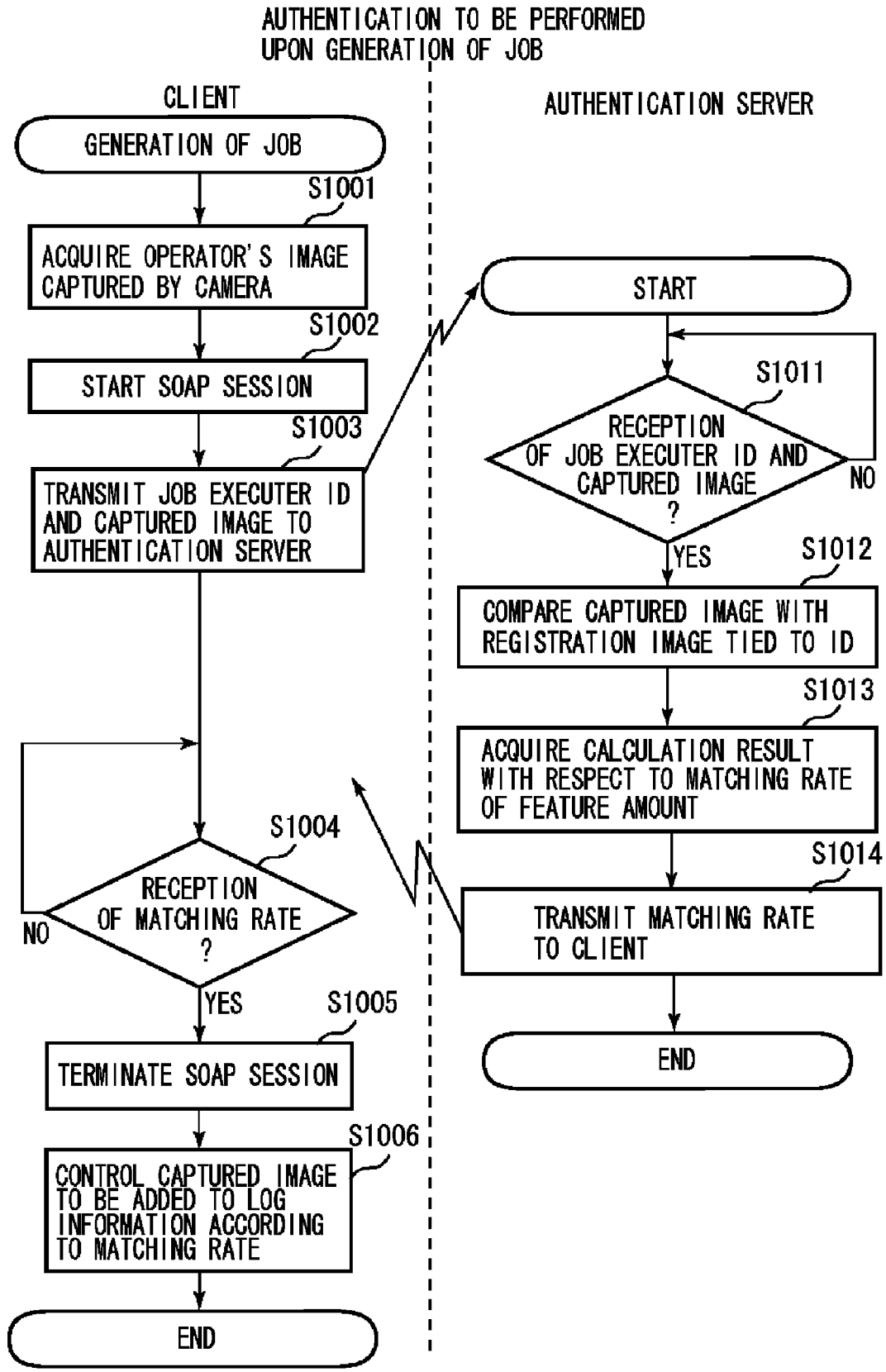
FIGS. 10A and 10B are flowcharts illustrating a procedure of data processing performed by the job processing system according to an exemplary embodiment of the present invention.

Then, the authentication server 107 calculates a matching rate with reference to photographic data tied to the user ID, which is registered beforehand, according to the procedure of a flowchart illustrated in FIG. 10B. Then, the authentication server 107 transfers a calculated value of the matching rate, as an authentication result, to the client PC 103 or the MFP 105.

Figure 2:
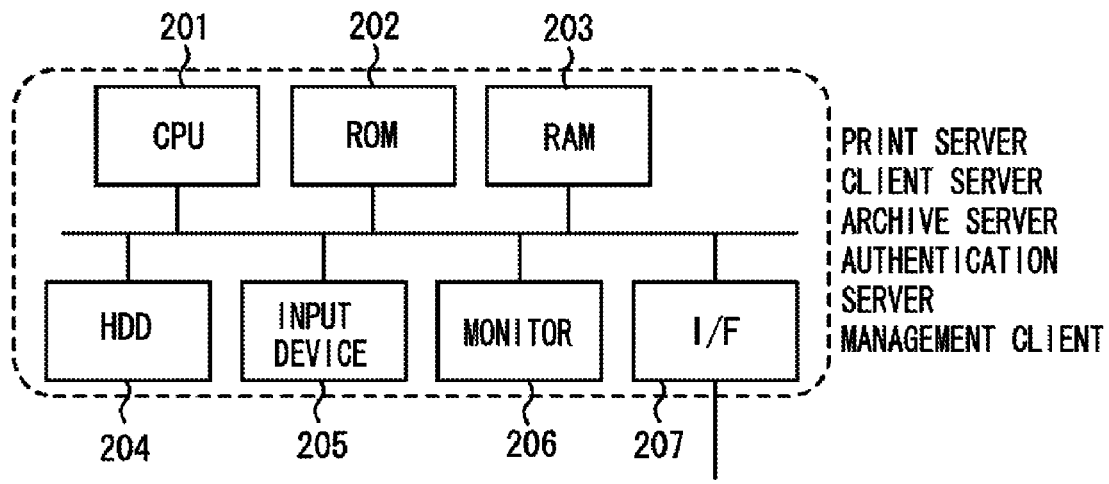
FIG. 2 is a block diagram illustrating a hardware configuration of a print server, a client PC, an archive server, an authentication server, or a management client illustrated in FIG. 1.

FIG. 2 is a block diagram illustrating a hardware configuration of the print server 102, the client PC 103, the archive server 106, the authentication server 107, or the management client 108 illustrated in FIG. 1. Each device is similar in configuration to a general purpose PC, such as IBM-PC/AT compatible machine. The clock frequency for a CPU, capacity of a RAM, and part of a ROM are inherent to each device. A storage device storing job information may have an optional storage capacity, which is selectable.

In FIG. 2, a CPU 201 is a central processing unit, which directly or indirectly controls each device (read only memory (ROM) 202, random access memory (RAM) 203, etc.) connected via an internal bus to the CPU 201. The CPU 201 executes a program to be used to realize the present invention.

The ROM 202 stores basic software, such as Basic Input/Output System (BIOS). The RAM 203 can be used as a work area of the CPU 201. The program to be used to realize the present invention can be temporarily stored in the RAM 203.

The RAM 203 stores a plurality of modules (printer driver, add-in, driver agent, etc.). The CPU 201 executes these modules to perform job tracking information transmission processing illustrated in FIGS. 10A and 10B.

Figure 11:
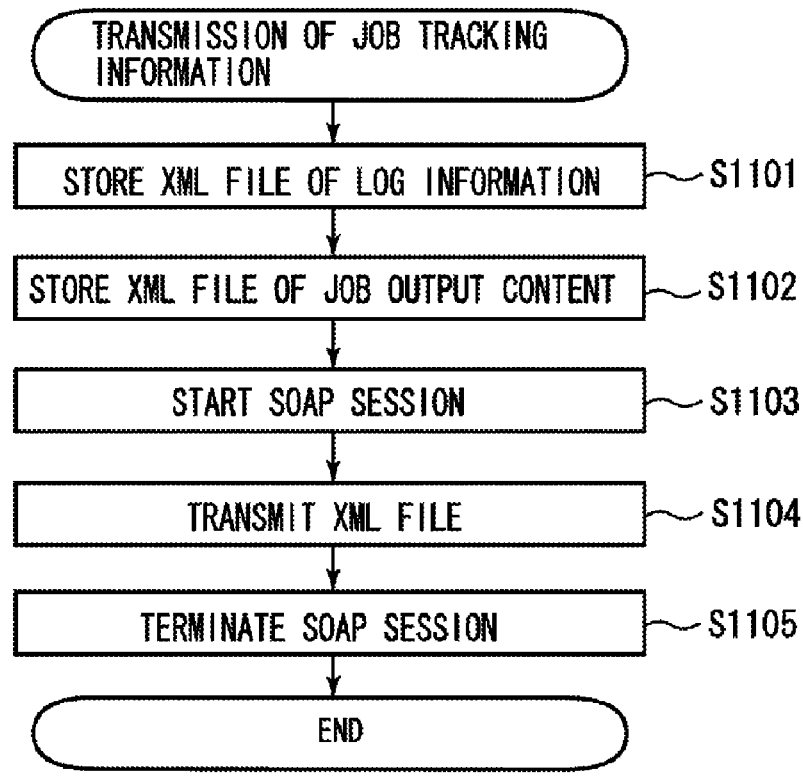
FIG. 11 is a flowchart illustrating an example procedure of data processing performed by the server apparatus according to an exemplary embodiment of the present invention.

Similarly, the RAM 203 of the archive server 106 functions as a device capable of receiving job tracking information and storing job tracking information as illustrated in FIG. 11.

A hard disk drive (HDD) 204 stores the program as a file, which can be loaded in the RAM 203 by the CPU 201. An input device 205 enables a user to operate an operation screen of a monitor, which can be provided by the program. The input device 205 includes a keyboard and a pointing device.

A monitor 206 enables a user to confirm an operation state of the input device 205. An interface (I/F) 207 is connected to the network 104 and includes a network controller.

Figure 3:
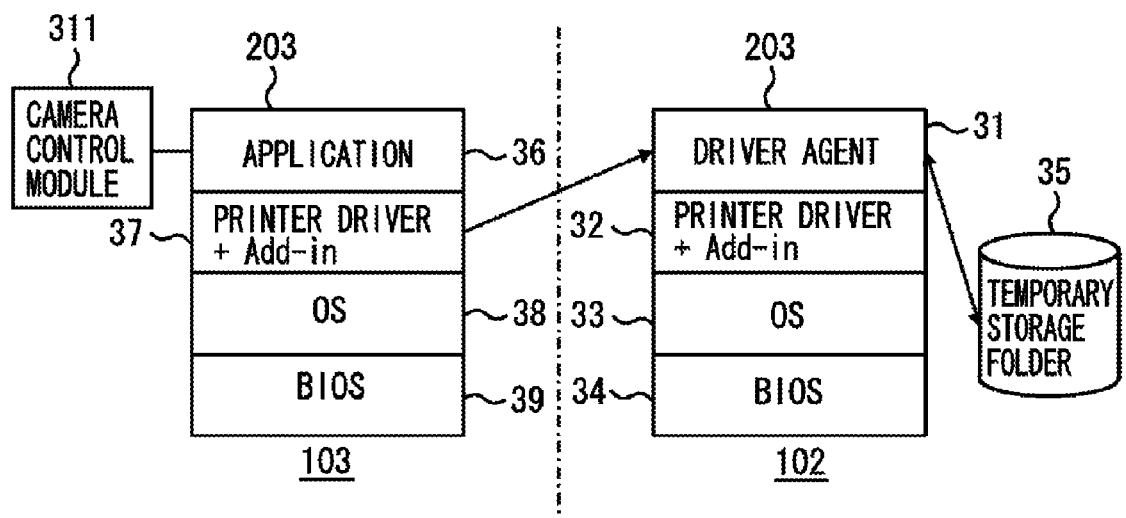
FIG. 3 illustrates an example configuration of a software module, which can operate on the client PC and the print server illustrated in FIG. 1.

FIG. 3 illustrates an example configuration of a software module, which can operate on the client PC 103 and the print server 102 illustrated in FIG. 1.

In FIG. 3, the client PC 103 includes a camera control module 311, which can control a camera to capture an image of a job operator when a job is generated. The camera control module 311 acquires photographic image data and transmits the acquired image data to the authentication server 107 together with a log-in ID of the job operator who have generated the job. The RAM 203 of the client PC 103 stores an application 36, a printer driver 37, an operating system (OS) 38, and a BIOS 39.

Then, the client PC 103 receives, from the authentication server 107, the feature quantity matching rate obtained from a comparison (biometric authentication) between a face image tied to the log-in ID, which is registered beforehand in the authentication server 107, and a face image to be obtained from the operator image captured upon generation of the job.

Figure 9:
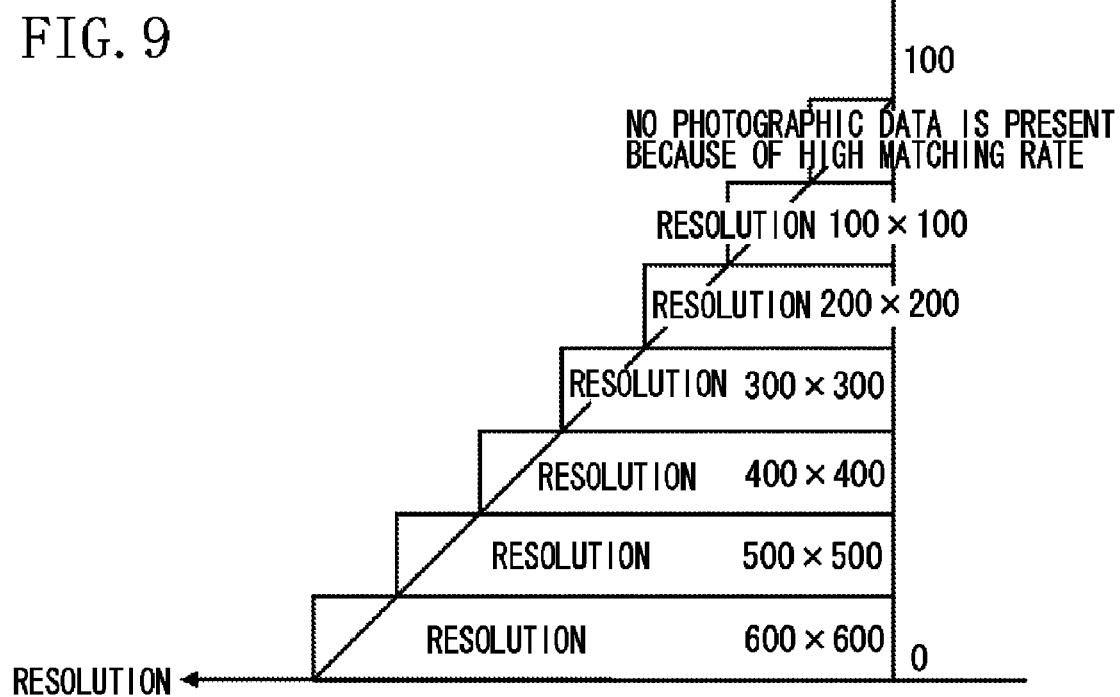
FIG. 9 is a characteristic graph illustrating a relationship between the matching rate obtained by the authentication server illustrated in FIG. 7 and resolution of a face image to be registered.

Then, the client PC 103 controls the information amount of photographic data to be left as log information for the job tracking information according to the feature quantity matching rate received from the authentication server 107, as illustrated in FIG. 9.

An add-in module 32, to be used to acquire a printer driver to be used by the printer 101 and job tracking information, is loaded in the RAM 203 of the print server 102. A driver agent 31, to be used to transmit the job tracking information received from the add-in module 32 to the archive server 106, is loaded in the RAM 203.

The add-in module 32 and the driver agent 31 are modules, which can operate on a platform, such as a BIOS 34 and an OS 33, which is loaded in the RAM 203 of the print server 102.

The driver agent 31 stores the job tracking information received from the add-in module 32 in a temporary storage folder 35 as an XML file, on the RAM 203 of the print server 102. The OS 33 performs handling of HyperText Transfer Protocol (HTTP) and Simple Object Access Protocol (SOAP), which serve as a protocol to be used to perform network communications. The temporary storage folder 35 can be secured on the HDD 204 of the print server 102.

Figure 4:
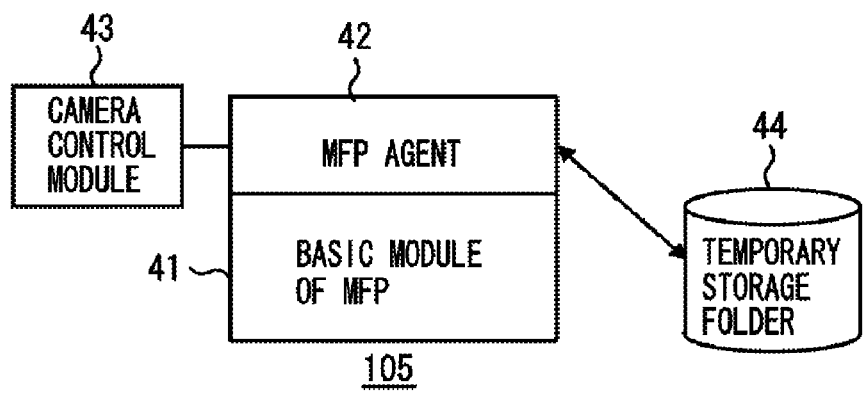
FIG. 4 illustrates an example configuration of a software module, which can operate on an MFP illustrated in FIG. 1.

FIG. 4 illustrates an example configuration of a software module, which can operate on the MFP 105 illustrated in FIG. 1.

As illustrated in FIG. 4, a basic module 41 of the MFP 105 and an MFP agent 42 to be used to transmit job tracking information received from the basic module 41 to the archive server 106 are loaded in a RAM of the MFP 105. In the present exemplary embodiment, the basic module 41 includes a group of modules, which can be referred to as a controller. The MFP agent 42 is configured as a module operable on the basic module 41 of the MFP 105.

Similar to the client PC 103, the MFP 105 includes a camera control module 43 capable of capturing an image of a job operator when a job is generated. The camera control module 43 acquires the photographic image data and transmits the acquired image data together with a log-in ID of the job operator to the authentication server 107.

Then, the MFP agent 42 receives, from the authentication server 107, the feature quantity matching rate obtained from the comparison (biometric authentication) between the face image tied to the log-in ID, which is registered beforehand in the authentication server 107, and the face image to be obtained from the operator image captured upon generation of the job.

Then, the MFP agent 42 controls the information amount of photographic data to be left, on a temporary storage folder 44, as log information for the job tracking information according to the feature quantity matching rate received from the authentication server 107, as illustrated in FIG. 9.

The MFP agent 42 stores the job tracking information received from the basic module 41 of the MFP 105, as an XML file, in the temporary storage folder 44 in an HDD of the MFP 105.

The basic module 41 performs handling of the HTTP and the SOAP, which serve as a protocol to be used to perform network communications.

FIG. 5 illustrates a module configuration of the archive server 106 illustrated in FIG. 1.

In FIG. 5, a service provider 51 operates on a platform, such as a BIOS 53 and an OS 52, to receive the job tracking information transmitted from the driver agent 31 or the MFP agent 42 and store the job tracking information in a back-end server 54.

The service provider 51 is a module operable on the platform, such as the BIOS 53 and the OS 52, to be loaded in the RAM 203 of the archive server 106.

A basic module (not illustrated) performs handling of the HTTP and the SOAP, which serve as a protocol to be used to perform network communications.

The back-end server 54 can combine document management systems or databases according to the number of printers and MFPs or according to the number of jobs to be handled.

FIG. 6A illustrates a module configuration of the service provider 51 illustrated in FIG. 5.

In FIG. 6A, an archive provider 511 receives the job tracking information transmitted from the driver agent 31 or the MFP agent 42. A data processing service 512 converts the format of an image contained in a print content or a job output content and extracts a text through optical character recognition (OCR) processing.

A back-end corresponding service 513 performs storage of the job tracking information stored in the temporary storage folder 514 according to an operation of an I/F connected to a back-end.

FIG. 6B illustrates an example job information table stored in the temporary storage folder 514 illustrated in FIG. 6A. According to the present exemplary embodiment, job information includes job ID, user ID, date, print data (scan BMP), matching rate, and photographic data of the job operator. In the present exemplary embodiment, the data amount of the photographic data is variable depending on the matching rate obtained from an authentication result of the authentication server 107.

As illustrated in FIG. 6B, the archive server 106 stores, for example, "NULL", indicating that photographic data having a higher matching rate is not stored in the temporary storage folder 514. Among the job tracking information acquired from the client PC 103, photographic data having a lower matching rate is stored in the temporary storage folder 514. Accordingly, photographic data of any user who needs not to be tracked is not stored.

Therefore, the storage area of the HDD 204 provided in the archive server 106 can be prevented from being occupied by unnecessary photographic data.

If lossless compression processing is performed on the photographic data having a lower matching rate, the amount of the photographic data to be stored in the storage area of the HDD 204 provided in the archive server 106 can be reduced.

Figure 7:
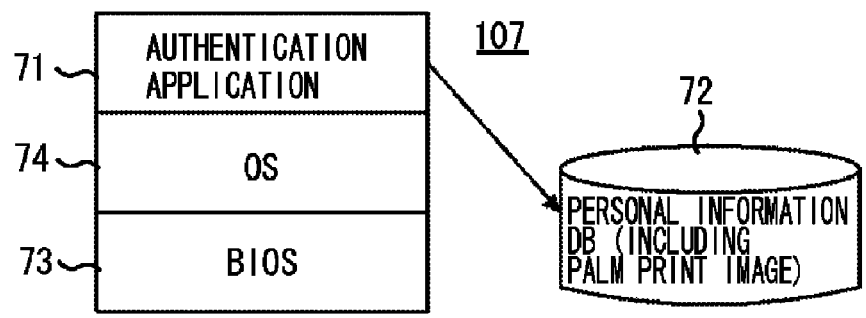
FIG. 7 illustrates an example configuration of a software module, which can operate on the authentication server illustrated in FIG. 1.

FIG. 7 illustrates an example configuration of a software module, which can operate on the authentication server 107 illustrated in FIG. 1.

In FIG. 7, an authentication application 71 of the authentication server 107 receives, at the timing when a job is generated, photographic data of a log-in user and a job executer from the client PC 103 or the MFP 105.

Then, the authentication application 71 performs comparison (biometric authentication) between the face image tied to the log-in ID, which is registered beforehand in a personal information database 72 of the authentication server 107, and the face image obtained from the photographic data of the operator captured upon generation of the job.

Then, the authentication application 71 calculates a feature quantity matching rate based on the comparison between the face images and transmits the calculated matching rate to the client PC 103 or the MFP 105. An example calculation of the feature quantity matching rate is described below with reference to FIG. 8.

The authentication application 71 is a module operable on a platform, such as a BIOS 73 and an OS 74, to be loaded in the RAM 203 of the authentication server 107.

A basic module (not illustrated) performs handling of the HTTP and the SOAP, which serve as a protocol to be used to perform network communications.

Figure 8:
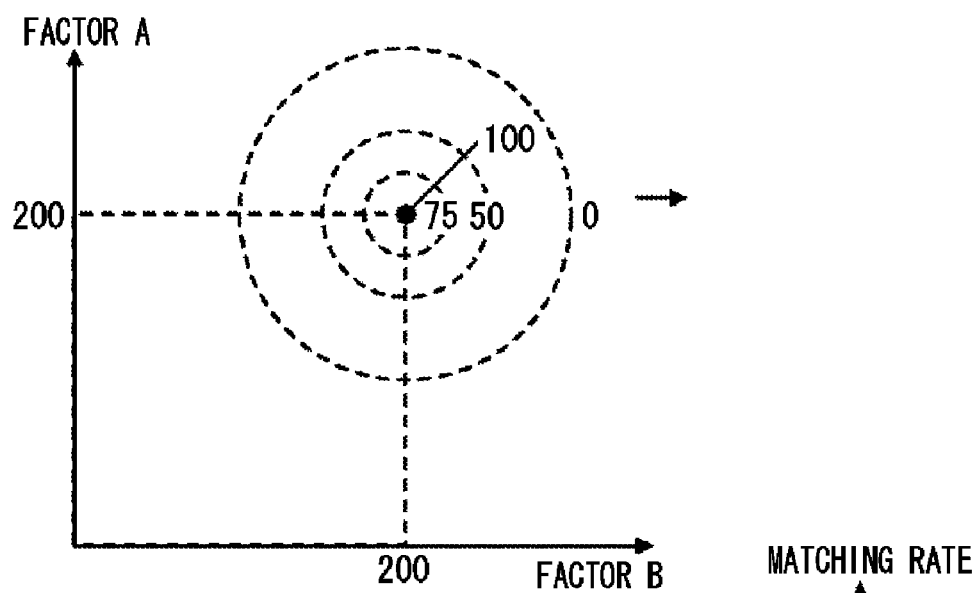
FIG. 8 is a characteristic graph illustrating an example feature quantity calculation, which is performed by the authentication server illustrated in FIG. 7.

FIG. 8 is a characteristic graph illustrating an example calculation of the feature quantity performed by the authentication server 107 illustrated in FIG. 7. In FIG. 8, the ordinate axis represents values of a factor A and the abscissa axis represents values of a factor B. Described hereinafter is an example method for calculating the feature quantity matching rate, which is usable in the biometric authentication. The calculation of the feature quantity matching rate, when actually performed, is dependent on an algorithm of the authentication application 71 installed on the authentication server 107 by a system provider.

The example illustrated in FIG. 8 is a method for calculating the feature quantity matching rate based on two factors A and B, which are parameters (factors) to be handled as palm print data.

The matching rate has a value in a range from 0 (unmatched) to 100 (matched).

The model illustrated in FIG. 8 is palm print data defined by the parameters, according to which the factor A is "200" and the factor B is "200." In the authentication performed on the palm print data (authentication target), the matching rate becomes close to 100 if both of the factors A and B are close to "200." The matching rate becomes close to 0 if the difference is large.

FIG. 9 is a characteristic graph illustrating an example relationship between the matching rate obtained by the authentication server 107 illustrated in FIG. 7 and the resolution of a face image to be registered. The example illustrated in FIG. 9 is an example relating to handling of the matching rate obtained by the authentication illustrated in FIG. 8 and the image captured at the job generation timing.

In FIG. 9, the abscissa axis represents the resolution and the ordinate axis represents the matching rate. According to the example illustrated in FIG. 9, determination of the resolution of photographic data is in a linear relationship with a numerical value representing the matching rate.

In the example illustrated in FIG. 9, the numerical value of the matching rate is in a range from 0 (unmatched) to 100 (matched), similar to the numerical range illustrated in FIG. 8. According to the example illustrated in FIG. 9, the resolution of an image of a job executer to be added to the job tracking information varies linearly according to the matching rate.

According to the example illustrated in FIG. 9, there are seven stepwise levels prepared beforehand according to the matching rate. No photographic data is present on the uppermost step corresponding to the highest matching rate, on the assumption that in this case the job operator surely accords with a person possessing the user ID (identification information).

Remaining six steps are allocated to different resolutions (600×600, 500×500, 400×400, 300×300, 200×200, and 100×100) according to the matching rate. As described above, if it is determined that the matching rate is low, the present exemplary embodiment precisely identifies the operator based on the image data having a higher resolution. In other words, the present exemplary embodiment increases stepwise the data size of image data to be used to identify the operator according to the decreasing magnitude of the matching rate. Therefore, the present exemplary embodiment can acquire a detailed image of the operator to register the operator if the operator is not yet registered.

More specifically, the client PC 103 or the MFP 105 stores the determination table to be used to adjust the data amount of the photographic data according to the matching rate calculated by the authentication server 107. Then, the user ID of the job operator and the photographic data having the resolution determined based on the determination table (photographic data of the job operator) are transmitted to the archive server 106 that performs job tracking processing.

Accordingly, if the matching rate is high, the present exemplary embodiment can prevent photographic data from being uselessly transferred to the archive server 106 and can prevent the storage area of the storage device of the archive server 106 from being occupied by useless photographic data.

If it is detected that the remaining amount of the storage area of the storage device provided in the archive server 106, which stores job information, is lower than a predetermined level, the following processing can be performed to adjust the data amount of photographic data to be added to the job information.

For example, if the remaining amount of the storage area of the storage device provided in the archive server 106 reaches 10% of the entire storage area, the resolution can be automatically lowered (for example, in a stepwise fashion) to secure a sufficient storage area for storing jobs.

FIGS. 10A and 10B are flowcharts illustrating a procedure of data processing performed by the job processing system according to the present exemplary embodiment. The processing illustrated in FIGS. 10A and 10B is example authentication processing performed by the authentication server 107 when a job is generated by the client PC 103 or the print server 102.

FIG. 10A is a flowchart illustrating an example procedure of the data processing performed by an information processing apparatus (the client PC 103 or the print server 102) according to the present exemplary embodiment. To realize the processing of each step, the CPU of the client PC 103 or the print server 102 executes a control program loaded in the RAM.

FIG. 10B is a flowchart illustrating an example procedure of the data processing performed by a management apparatus (the authentication server 107) according to the present exemplary embodiment. To realize the processing of each step, the CPU of the authentication server 107 executes a control program loaded in the RAM.

In step S1001, the CPU of the client PC 103 or the print server 102 controls the camera 109 to acquire an image of a job operator. The acquisition timing of the job operator's image is immediately after the job generation timing of the client side (the client PC 103 or the print server 102). In this case, the photographic resolution is set to be a highest resolution level attainable by the camera 109 to acquire a fine image.

In step S1002, the CPU of the client PC 103 or the print server 102 starts a SOAP session with the authentication application 71 operating on the authentication server 107.

In step S1003, the CPU of the client PC 103 or the print server 102 transmits, as an attached file of the SOAP, a log-in ID of a job executer who executes the job and the photographic image acquired in step S1001 to the authentication server 107, for example, using Messages with Attachments (SwA) or Distributed Instrumentation and Measurement Environment (DIME). In the present exemplary embodiment, a face image of the job executer is a target image to be authenticated.

In step S1004, the CPU of the client PC 103 or the print server 102 waits for an authentication result (the feature quantity matching rate) to be returned from the authentication server 107.

Meanwhile, if in step S1011 the authentication server 107 receives the log-in ID transmitted from the client PC 103 in step S1003 and the photographic image acquired in step S1001 (YES in step S1011), the processing proceeds to step S1012.

In step S1012, the authentication server 107 executes the authentication application 71 to compare the face image tied to the log-in ID, which is registered beforehand in the personal information database 72 of the authentication server 107, with the face image obtainable from the photographic image received in step S1011.

The authentication application 71 performs the biometric authentication based on the comparison of two face images and calculates a feature quantity matching rate.

In step S1013, the authentication server 107 acquires, as an authentication result, the feature quantity matching rate, which was calculated based on the comparison of two face images, from the authentication application 71. In step S1014, the authentication server 107 transmits the acquired matching rate to the client PC 103 or the print server 102 and then terminates the processing of the routine illustrated in FIG. 10B.

On the other hand, if in step S1004 the client PC 103 or the print server 102 receives the matching rate calculated by the authentication application 71 from the authentication server 107 (YES in step S1004), the processing proceeds to step S1005.

In step S1005, the CPU of the client PC 103 or the print server 102 terminates the SOAP session, which has been performed with the authentication server 107 via the network 104.

In step S1006, the CPU of the client PC 103 or the print server 102 determines processing to be applied to the photographic image acquired in step S1001 according to the matching rate acquired from the authentication server 107 and terminates the processing of the routine illustrated in FIG. 10A.

The CPU of the client PC 103 or the print server 102 determines whether the photographic image captured by the camera 109 is added as log information based on the matching rate and, if the photographic image is added as the log information, determines a resolution value to be added according to the matching rate. The resolution value can be determined according to the determination table, which has the characteristics illustrated in FIG. 9.

FIG. 11 is a flowchart illustrating an example procedure of data processing performed by the server apparatus according to the present exemplary embodiment. The example illustrated in FIG. 11 is example processing performed by the driver agent 31 illustrated in FIG. 3 or the MFP agent 42 illustrated in FIG. 4 to transmit job tracking information to the archive server 106. In the present exemplary embodiment, the job tracking information transmitted from the MFP agent 42 to the archive server 106 is a log of an output job. The job tracking information transmitted from the driver agent 31 to the archive server 106 is a print log.

The driver agent 31 and the MFP agent 42 perform similar basic operations to transmit the job tracking information. Hereinafter, the operation performed by the driver agent 31 is described below. To realize the processing of each step, the CPU of the print server 102 executes a control program loaded in the RAM from the ROM or the HDD.

In step S1101, the driver agent 31 of the print server 102 stores the log information, as an XML file, in the temporary storage folder 35 as illustrated in FIG. 3.

In the present exemplary embodiment, the log information includes a photographic image (a face image of a user who executes a print request), which is edited based on the photographic image captured by the camera 109 in step S1006. In this case, the photographic image is encoded into a text format and stored as an XML file.

The driver agent 31 receives log information from the add-in module 37 of the client PC 103 via the I/F 207 and stores the log information, as an XML file, in the temporary storage folder 35 of HDD 204.

In step S1102, the driver agent 31 stores a job output content (image, text), as an XML file, in the temporary storage folder 35. In this case, similar to the processing in step S1101, the image is encoded into a text format and stored as an XML file.

In step S1103, the driver agent 31 starts a SOAP session with the archive provider 511 of the archive server 106 illustrated in FIG. 6. In step S1104, the driver agent 31 transmits the XML files of the log information and the job output content (image, text), as attached files, to the archive provider 511. In step S1105, the driver agent 31 terminates the SOAP session and terminates the processing of the routine illustrated in FIG. 11.

As described above, the print server 102 can transmit the XML files of the log information and the job output content (image, text), as attached files, to the archive provider 511.

Accordingly, the archive server 106 can receive and process the log information, which may be different in contents, and image data, which may be different in file format, regardless of the differences between the client PC 103 and the MFP 105.

Therefore, a single archive provider (the archive provider 511) can perform similar processing on the job tracking information transmitted from the driver agent 31 and the MFP agent 42.

If the MFP 105 performs the above-described steps, the MFP 105 performs the processing of step S1101 and subsequent steps in the following manner. In step S1101, the MFP agent 42 illustrated in FIG. 4 receives the log information from the basic module 41 via the internal I/F of the MFP 105 and stores the received log information, as an XML file, in the temporary storage folder 44 of the HDD in the MFP 105.

Figure 12:
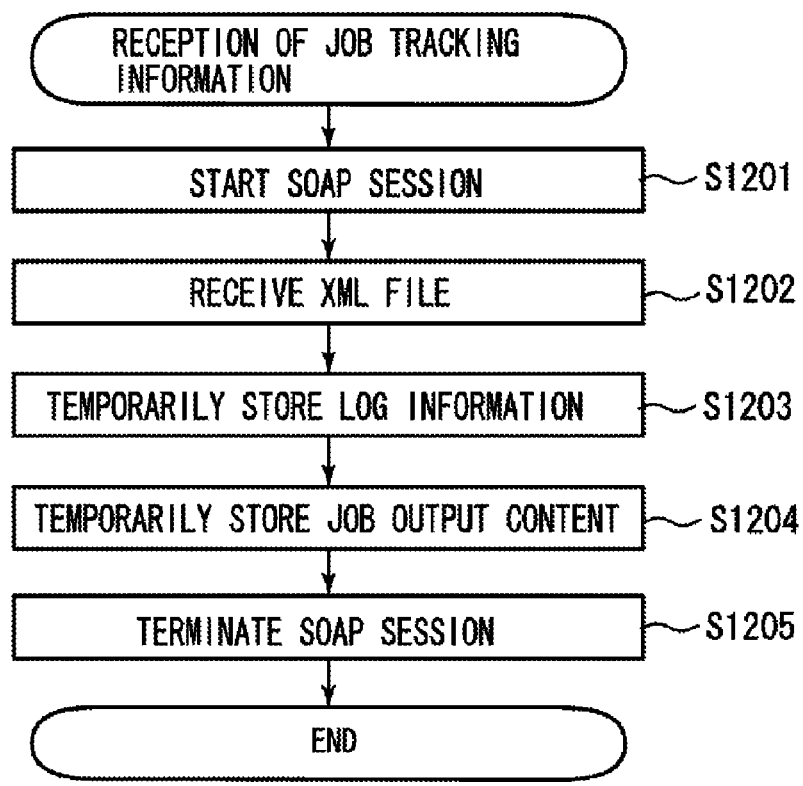
FIG. 12 is a flowchart illustrating an example procedure of data processing performed by the server apparatus according to an exemplary embodiment of the present invention.

FIG. 12 is a flowchart illustrating an example procedure of data processing performed by the server apparatus according to the present exemplary embodiment. The example illustrated in FIG. 12 is example processing performed by the service provider 51 of the archive server 106 illustrated in FIG. 1 to receive the job tracking information from the driver agent 31. The service provider 51 of the archive server 106 performs similar processing to receive the job tracking information from the MFP agent 42. To realize the processing of each step, the CPU of the archive server 106 executes a control program loaded in the RAM from the ROM or the HDD.

In step S1201, the archive provider 511 of the service provider 51 starts a SOAP session via the I/F 207 with the driver agent 31 under the handling by the OS 52 in response to a start request of the SOAP session transmitted from the driver agent 31 in step S1103 illustrated in FIG. 11. When the MFP 105 transmits the log information, the archive provider 511 accepts the start request of the SOAP session transmitted from the MFP agent 42.

In step S1202, the archive provider 511 receives the XML files of the log information and the job output content (image, text), which are transmitted via the I/F 207 as the attached file of the SOAP.

In step S1203, the data processing service 512 of the service provider 51 stores the received log information in the temporary storage folder 514 of the HDD 204 in the archive server 106.

In step S1204, the data processing service 512 of the service provider 51 stores the received job output content (image, text) in the temporary storage folder 514, similar to the processing in step S1203. In step S1205, the archive provider 511 terminates the SOAP session and terminates the processing of the routine illustrated in FIG. 12.

When the job tracking information stored in the temporary storage folder 514 is referred to, the management client 108 can be configured to execute authentication based on the administrator right and acquire the job tracking information to enable a user to confirm the acquired information using the browser software.

In this case, the tracking information can be acquired from the archive server 106 in ascending order of matching rate according to acquisition conditions requested by the administrator of the management client 108, thereby reducing the processing load for a user to be tracked.

Figure 13:
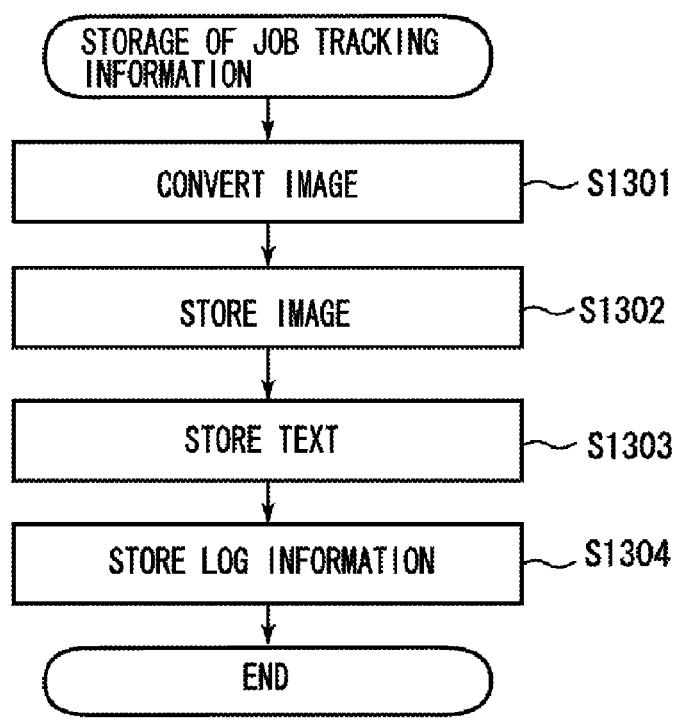
FIG. 13 is a flowchart illustrating an example procedure of data processing performed by the server apparatus according to an exemplary embodiment of the present invention.

FIG. 13 is a flowchart illustrating an example procedure of data processing performed by the server apparatus according to the present exemplary embodiment. The example illustrated in FIG. 13 is example processing performed by the archive server 106 illustrated in FIG. 1 to store the received job tracking information in the back-end server 54. To realize the processing of each step, the CPU of the archive server 106 executes a control program (including the service provider 51) loaded in the RAM from the ROM or the HDD.

In step S1301, the service provider 51 converts the image transmitted from the driver agent 31 and the image transmitted from the MFP agent 42, which are different in file format, into images having the same file format. In the present exemplary embodiment, the service provider 51 converts the above-described images into, for example, PDF images which can be processed by the back-end server 54.

If the service provider 51 receives only image data from the MFP agent 42, the service provider 51 can acquire a text through the optical character recognition (OCR) if necessary.

In step S1302, if the back-end server 54 is a document management system, the service provider 51 stores an image extracted from the temporary storage folder 514 by the back-end corresponding service 513, as a document, in the back-end server 54.

In this case, a job folder, such as a subordinate folder of a host folder created on a day-by-day basis, can be created as a storage destination. The image data of each job can be stored, as a document, in the creased job folder.

In step S1303, the service provider 51 stores a text in a folder created by the back-end server 54, in a similar way to the image stored in step S1302.

In step S1304, the service provider 51 extracts the log information from the temporary storage folder 514, and stores XML elements (e.g., user name, time stamp, and photographic data of a print executer), as index information of the image stored as a document in step S1302, in the back-end server 54.

According to the above-described exemplary embodiment, if the back-end server 54 is a document management system and if photographic data of a job operator is added every time as job tracking information of each job output, the size of the photographic data can be dynamically changed according to the feature quantity matching rate. Therefore, the exemplary embodiment can secure a sufficient amount of history data for a job having a lower matching rate (i.e., a job to be monitored) and can effectively use the storage capacity of the archive server 106.

In this case, only one server apparatus can be configured to realize the functional processing performed in the archive server 106 and the authentication server 107.

According to the above-described exemplary embodiments, the volume (data amount) of the tracking target information can be dynamically changed according to the feature quantity matching rate obtained based on the photographic data of the job operator. Therefore, if the target job is a job to be monitored (i.e., when the matching rate of the photographic data of the job operator is so low that log-in ID spoofing may occur), the exemplary embodiment can secure a sufficient amount of history data for the job and can effectively use the storage capacity of the archive server 106.

As each job operator is authenticated with reference to the face information tied to the log-in ID and registered beforehand, any job request by a non-authorized job operator can be excluded.

As another exemplary embodiment, the data size of any data having a changeable resolution, such as an image constituting part of a group data attached as job history information, can be changed linearly according to the feature quantity matching rate obtained from the biometric authentication.

For example, similar to the photographic data of the job operator, the data size of image data (part of the job output content) in step S1102 illustrated in FIG. 11 can be changed linearly according to the feature quantity matching rate obtained from the biometric authentication.

In this case, if the matching rate in the authentication is high (i.e., when the target job is normal), the data size of job history information can be reduced to save the storage capacity.

As another exemplary embodiment, if the camera can sequentially capture a plurality of job operator's photographic images upon generation of a job and the acquired photographic images are used to calculate a feature quantity matching rate based on the biometric authentication, the following processing (1) and (2) can be added.

(1) Among the plurality of photographic images captured by the camera, a calculation value having the highest matching rate is used as a feature quantity matching rate for the job.

(2) Acquisition of the job operator's photographic image at the job generation and calculation of the feature quantity matching rate are repeated until the calculated matching rate becomes equal to or greater than a threshold.

If the acquired image data include a plurality of photographic images of a job operator, a photographic image having the highest feature quantity matching rate can be stored as job log information.

Figure 14:
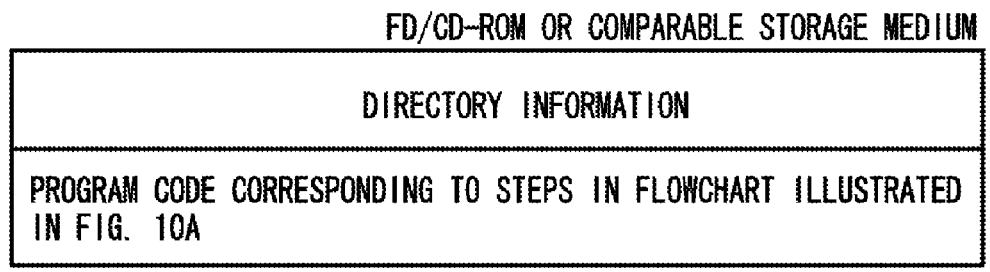
FIG. 14 illustrates a memory map of a storage medium storing various data processing programs, which can be read by the information processing apparatus according to an exemplary embodiment of the present invention.

FIG. 14 illustrates a memory map of a storage medium storing various data processing programs, which can be read by the information processing apparatus according to an exemplary embodiment of the present invention.

Figure 15:
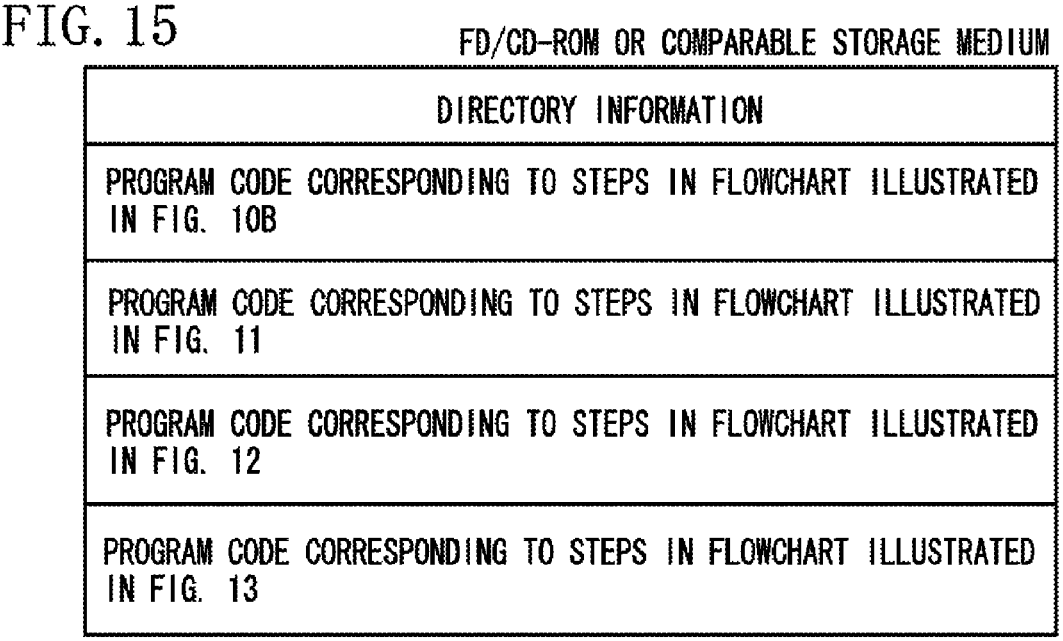
FIG. 15 illustrates a memory map of a storage medium storing various data processing programs, which can be read by the server apparatus according to an exemplary embodiment of the present invention.

FIG. 15 illustrates a memory map of a storage medium storing various data processing programs, which can be read by the server apparatus according to an exemplary embodiment of the present invention.

Although not illustrated in the drawing, the storage medium can store management information for the programs stored in the storage medium, version information, creator name, and information relevant to the OS that reads the programs, e.g., icons, which is displayed to discriminate the programs.

A directory of the storage medium can manage data belonging to various programs. Moreover, the storage medium can store a program to be used to install various programs on a computer and a decompression program if the installed program is compressed.

A host computer can realize the functions of the present exemplary embodiments illustrated in FIGS. 10A to 13 if the host computer executes computer program(s) installed from an external device. The present invention is applicable in a case where group information including the program is supplied to an output apparatus using a storage medium (e.g., CD-ROM, flash memory, and floppy disk (FD)) or from an external storage medium via a network.

As described above, a storage medium storing software program code capable of realizing the functions of the above-described exemplary embodiments is supplied to a system or an apparatus. Then, a computer (or CPU or micro-processing unit (MPU)) of the system or the apparatus executes the program code read out from the storage medium to attain the present invention.

In this case, the program code itself, when read out of the storage medium, realizes new functions brought by the present invention. A storage medium storing the program code constitutes the present invention.

Accordingly, the type of the program can be one of object code, interpreter program, and OS script data, which have functions comparable to the program.

A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

In this case, the program code itself read out of the storage medium can realize the functions of the above-described exemplary embodiments. The storage medium storing the program code can constitute the present invention.

The method for supplying the program includes accessing a website on the Internet using the browsing function of a client computer, when the website allows each user to download the computer program according to the exemplary embodiments of the present invention, or compressed files of the programs having automatic installing functions, to a hard disk or other storage medium of the user. Furthermore, the program code constituting the programs according to the exemplary embodiments of the present invention can be divided into a plurality of files so that respective files are downloadable from different websites. Namely, the present invention encompasses World Wide Web (WWW) servers and File Transfer Protocol (FTP) servers that allow numerous users to download the program files so that their computers can realize the functions and processes according to the exemplary embodiments of the present invention.

The programs according to the exemplary embodiments of the present invention can be enciphered and the enciphered programs can be stored on a CD-ROM or a comparable recording medium when the programs of the present invention are distributed to the users. Any authorized users (i.e., users satisfying predetermined conditions) are allowed to download key information from a website on the Internet. The users can decipher the programs with the obtained key information and can install the programs on their computers.

When the computer reads and executes the installed programs, the computer can realize the functions of the above-described exemplary embodiments. Moreover, an operating system (OS) or other application software running on a computer can execute part or all of actual processing based on instructions of the programs.

Additionally, the program code read out of a storage medium can be written into a memory of a function expansion board equipped in a computer or into a memory of a function expansion unit connected to the computer. In this case, based on instructions of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-065798 filed Mar. 14, 2008, which is hereby incorporated by reference herein in its entirety.

What is claimed is:

1. A job processing system comprising:
an information processing apparatus configured to output a job; and
a server apparatus, in which the information processing apparatus and the server apparatus can communicate with each other,
wherein the server apparatus includes,
a storage unit configured to store photographic data of a user,
an acquisition unit configured to acquire photographic data of a job operator captured in response to the job being generated, and
a calculation unit configured to calculate a matching rate based on a comparison between the photographic data acquired by the acquisition unit and the photographic data stored in the storage unit; and
wherein the information processing apparatus includes,
an imaging unit configured to capture an image of the job operator as the photographic data of the job operator,
a transfer unit configured to transfer the photographic data of the job operator to the server apparatus, and
a reception unit configured to receive the matching rate calculated by the server apparatus; and
a transmission unit configured to transmit job tracking information to an archiving server apparatus for archiving the job tracking information,
wherein the transmission unit
1) transmits the job tracking information including an image of a content of the output job but not including the photographic data of the job operator to the archiving server apparatus in response to the matching rate calculated by the server apparatus being larger than a first value,
2) transmits the job tracking information including a low-resolution photographic data of the job operator and the image of the content of the output job to the archiving server apparatus in response to the matching rate calculated by the server apparatus being equal to or smaller than the first value but larger than a second value, and 3) transmits the job tracking information including a high-resolution photographic image of the job operator and the image of the content of the output job to the archiving server apparatus in response to the matching rate calculated by the server apparatus being equal to or smaller than the second value.

2. The job processing system according to claim 1, wherein a determination unit is configured to reduce a data size of the photographic data to be added to log information in response to the matching rate being higher and to increase the data size of the photographic data to be added to the log information in response to the matching rate being lower.

3. The job processing system according to claim 1, wherein the calculation unit is configured to obtain, as the matching rate, a highest value by comparing a plurality of photographic data acquired by the acquisition unit from the information processing apparatus with the photographic data stored in the storage unit.

4. The job processing system according to claim 1, wherein the calculation unit is configured to repeat the calculation of the matching rate until a value, which is obtained by comparing a plurality of photographic data continuously acquired by the acquisition unit from the information processing apparatus with the photographic data stored in the storage unit, becomes equal to or greater than a predetermined threshold.

5. An information processing apparatus that communicates with a server apparatus configured to perform authentication processing, the information processing apparatus comprising:

an imaging unit configured to capture an image of a job operator; as photographic data of the job operator;

a transfer unit configured to transfer the photographic data of the job operator to the server apparatus;

a reception unit configured to receive a matching rate calculated by the server apparatus; and a transmission unit configured to transmit job tracking information to an archiving server apparatus for archiving the job tracking information, wherein the transmission unit 1) transmits the job tracking information including an image of a content of the output job but not including the photographic data of the job operator to the archiving server apparatus in response to the matching rate calculated by the server apparatus being larger than a first value, 2) transmits the job tracking information including a low-resolution photographic data of the job operator and the image of the content of the output job to the archiving server apparatus in response to the matching rate calculated by the server apparatus being equal to or smaller than the first value but larger than a second value, and 3) transmits the job tracking information including a high-resolution photographic image of the job operator and the image of the content of the output job to the archiving server apparatus in response to the matching rate calculated by the server apparatus being equal to or smaller than the second value.

6. A method for processing a job in an information processing apparatus capable of communicating with a server apparatus configured to perform authentication processing, the method comprising:

capturing an image of a job operator as photographic data of the job operator;

transferring the photographic data of the job operator to the server apparatus;

receiving a matching rate calculated by the server apparatus; and transmitting job tracking information to an archiving server apparatus for archiving the job tracking information, wherein transmitting includes 1) transmitting the job tracking information including an image of a content of the output job but not including the photographic data of the job operator to the archiving server apparatus in response to the matching rate calculated by the server apparatus being larger than a first value, 2) transmitting the job tracking information including a low-resolution photographic data of the job operator and the image of the content of the output job to the archiving server apparatus in response to the matching rate calculated by the server apparatus being equal to or smaller than the first value but larger than a second value, and 3) transmitting the job tracking information including a high-resolution photographic image of the job operator and the image of the content of the output job to the archiving server apparatus in response to the matching rate calculated by the server apparatus being equal to or smaller than the second value.

7. A non-transitory computer-readable storage medium storing a program that causes an information processing apparatus to perform the method according to claim 6.

* * * * *